United States Patent
Leymann et al.

(10) Patent No.: US 6,725,445 B1
(45) Date of Patent: Apr. 20, 2004

(54) SYSTEM FOR MINIMIZING NOTIFICATIONS IN WORKFLOW MANAGEMENT SYSTEM

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 09/611,732

(22) Filed: Jul. 7, 2000

(30) Foreign Application Priority Data

Jul. 8, 1999 (EP) .............................. 99113201

(51) Int. Cl.$^7$ ................................ G06F 9/44
(52) U.S. Cl. ...................... 717/101; 717/102; 717/103; 700/14; 700/101; 705/8; 709/101; 709/207
(58) Field of Search ................................ 717/100–104; 707/1, 3; 709/101, 207; 700/101, 14; 705/8

(56) References Cited

U.S. PATENT DOCUMENTS

| | | | | |
|---|---|---|---|---|
| 5,517,606 A | * | 5/1996 | Matheny et al. | 345/810 |
| 5,627,764 A | * | 5/1997 | Schutzman et al. | 709/207 |
| 5,826,239 A | * | 10/1998 | Du et al. | 705/8 |
| 5,893,128 A | * | 4/1999 | Nauckhoff | 715/511 |
| 5,960,420 A | * | 9/1999 | Leymann et al. | 707/1 |
| 6,038,538 A | * | 3/2000 | Agrawal et al. | 705/7 |
| 6,058,413 A | * | 5/2000 | Flores et al. | 709/101 |
| 6,073,109 A | * | 6/2000 | Flores et al. | 705/8 |
| 6,199,068 B1 | * | 3/2001 | Carpenter | 707/100 |
| 6,292,803 B1 | * | 9/2001 | Richardson et al. | 707/102 |
| 6,349,238 B1 | * | 2/2002 | Gabbita et al. | 700/101 |
| 6,424,354 B1 | * | 7/2002 | Matheny et al. | 345/619 |
| 6,492,912 B1 | * | 12/2002 | Jones | 340/994 |
| 6,493,675 B1 | * | 12/2002 | Kanaya et al. | 705/7 |

OTHER PUBLICATIONS

Title: A Transactional Workflow based Distributed Application Composition and Execution Environment, author: Shrivastava et al, ACM, 1998.*
Title: Workflow Management Systems for Financial Services, author: Sachael et al, 1993, ACM.*
Title: A Flexible and recoverable client/server database event notification system, Hanson et al, ACM, Feb. 1998.*
Title: A Configuration Management Approach for Large Workflow Management Systems, author: Schuster et al, ACM, Mar., 1999.*
Title: A Workflow Data Distribution Strategy for Scalable Workflow Management Systems, author: Schuster, ACM, Apr., 1997.*
Title: A flexible and recoverable client/server database event notification system, author: Hanson et al, ACM, Feb. 1998.*

* cited by examiner

Primary Examiner—Chameli Chaudhuri Das
(74) Attorney, Agent, or Firm—Gregory M. Doudnikoff

(57) ABSTRACT

The present invention relates to a technique for improving the handling of notification items related to the execution of process model instances and/or activity instances within a Workflow Management System (WFMS) or a computer system with comparable functionality. A notification group definition associates a notification group with at least one process model and/or at least one activity. The process model and/or the activity are associated with a notification specification referring to an addressee, for whom the WFMS creates and to whom the WFMS sends a notification item if an instance of the associated process model and/or an instance of the associated activity is not completed according to certain conditions. The WFMS is responsive to the notification group definition by sending a notification group item to the addressee as representative of one or many created notification items of associated process models and/or associated activities. This prevents individually created notification items from being sent to the addressee.

17 Claims, 3 Drawing Sheets

FIG. 1

```
                                              101
PROGRAM_ACTIVITY ProcessLoan
    NOTIFICATION
        AFTER 1 DAY TO PROCESS_ADMINISTRATOR
END ProcessLoan
                102                            103
```

FIG. 2

```
NOTIFICATION_GROUP Example1      202
    TIME_PERIOD 4 HOURS
    TYPE PROCESS_NOTIFICATIONS
    SOURCE PROCESS 'Loans'        203
END Example1
                    201
```

FIG. 3

```
NOTIFICATION_GROUP Example2    302
    TIME_PERIOD UNLIMITED
    TYPE ACTIVITY_NOTIFICATIONS
    SOURCE PROCESS 'Loan Process' ACTIVITY 'Assess Risk'
    FOR EACH USER
END Example2    303                      301
```

SYSTEM FOR MINIMIZING NOTIFICATIONS IN WORKFLOW MANAGEMENT SYSTEM

BACKGROUND OF THE INVENTION

1. Field of the Invention

The present invention relates to a system and a method for improving the handling of notification items related to the execution of instances of process models and/or activities within a Workflow Management System (WFMS) or a computer system with comparable functionality.

2. Description of the Related Art

A new area of technology with increasing importance is the domain of Workflow Management Systems (WFMS). WFMS support the modeling and execution of business processes. Business processes executed within a WFMS environment control which piece of work of a network of pieces of work will be performed by whom and which resources are exploited for this work. The individual pieces of work might be distributed across a multitude of different computer systems connected by some type of network.

The product "IBM MQSeries Workflow" (previously called IBM FlowMark) represents such a typical modern, sophisticated, and powerful workflow management system. It supports the modeling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via IBM MQSeries Workflow's Flow Definition Language (FDL) or via the built-in graphical editor. The runtime component of the workflow management system interprets the process graph and distributes the execution of activities to the right person at the right place, e.g. by assigning tasks in the form of work items to one or more worklists associated with the respective person, wherein the worklists and work items are stored as digital data within the workflow or process management system.

Workflow management systems are pro-active systems; that means they take actions if out-of-line situations occur. To support this behavior, they allow to associate with the construct of a business process, i.e. a process model, appropriate performance characteristics and the action to be taken in case the specified performance characteristics are not met. At build time, the process modeler can specify a maximum duration for the process and the individual activities in it. For example, a certain activity could be limited to one day and the entire process to four days. If one activity is not completed in the specified duration, a notification item is created and sent to a specified user's work list (for instance informing the manager of the employee assigned to that task). If this user does not act on the notification in a period also specified in build time, then a second notification item is created and sent to a further specified user's work list (for instance the process administrator's work list). If a process itself becomes overdue, a process notification item is created and sent to the worklist of the process administrator.

The problem with this approach is that certain situations could cause a myriad of notifications to be sent out. If, for example, an employee can not handle the assigned workload, it may happen that notifications are sent for each of the assigned work items as the employee is always in catch up mode. Thus a potentially large number of notification items are created and sent to the appropriate user. This not only causes the appropriate worklist of the designated user to be swamped with notification items, but increases the load of the underlying network with adverse effects on the overall performance.

The present invention provides an approach that reduces the number of notification items to be created and sent to certain addressees, if an instance of a process model and/or an instance of an activity is not completed according to certain conditions, while still maintaining the full flexibility of the system.

SUMMARY OF THE INVENTION

The present invention relates to a technique for improving the handling of notification items related to the execution of process model instances and/or activity instances within a Workflow Management System or a computer system with comparable functionality (WFMS). The current invention provides a notification group definition associating a notification group with at least one process model and/or at least one activity. Furthermore, the process model and/or the activity are associated with a notification specification referring to an addressee, for whom the WFMS creates and sends to a notification item, if an instance of the associated process model and/or an instance of the associated activity is not completed according to certain conditions. The WFMS is responsive to the notification group definition by sending to the addressee a notification group item as representative for one or a multitude of created notification items of associated process models and/or associated activities, thus preventing individually created notification items from being sent to the addressee.

The approach of the present invention significantly reduces the number of notification items to be created and sent to certain addressees and thus improves clarity of the addressee's work list; it will not be swamped with notification items which are the result of the same problem. Moreover, the communication load and risk of congestion within the computer network is reduced.

BRIEF DESCRIPTION OF THE DRAWINGS

FIG. 1 shows an example of definitions depicting how a notification is specified using the Flow Definition Language (FDL) of MQSeries Workflow and the workflow management system being responsive to these notification specifications;

FIG. 2 illustrates the definition and properties of notification groups for process notifications according to the present invention;

FIG. 3 illustrates the definition and properties of notification groups for activity notifications according to the present invention;

DESCRIPTION OF THE PREFERRED EMBODIMENT

Figure 4:
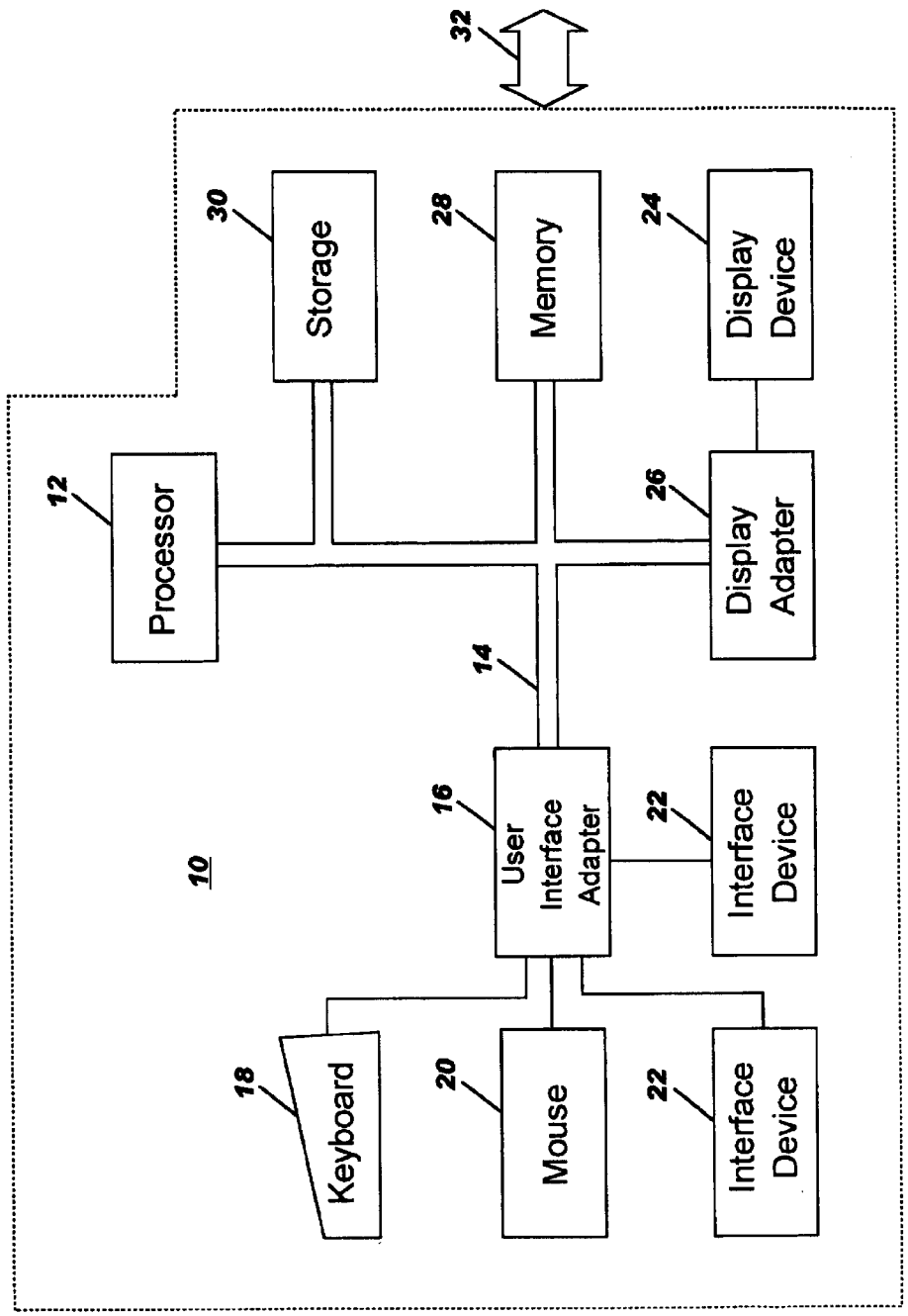
FIG. 4 is a pictorial representation of a data processing system which may be utilized to implement the present invention.

A preferred embodiment of the invention is set forth in the drawings and specification. Although specific terms are used, the description thus given uses terminology in a generic and descriptive sense only and not for purposes of limitation.

The current invention is illustrated based on IBM's "MQSeries Workflow" workflow management system. Of course any other WFMS could be used instead. Furthermore, the present invention applies also to any other type of system which offers WFMS functionalities not as a separate WFMS but within some other type of system.

Introduction

The following is a short outline on the basic concepts of a workflow management system based on IBM's MQSeries Workflow WFMS. From an enterprise point of view, the management of business processes is becoming increasingly important. Business processes (or processes for short) control which piece of work will be performed by whom and which resources are exploited for this work, i.e., a business process describes how an enterprise will achieve its business goals. A WFMS may support both the modeling of business processes and their execution.

Modeling of a business process as a syntactical unit in a way that is directly supported by a software system is extremely desirable. Moreover, the software system can also work as an interpreter, basically getting as input such a model. The model, called a process model or workflow model, can then be instantiated and the individual sequence of work steps, depending on the context of the instantiation of the model, can be determined. Such a model of a business process can be perceived as a template for a class of similar processes performed within an enterprise; it is a schema describing all possible execution variants of a particular kind of business process. An instance of such a model and its interpretation represents an individual process, i.e., a concrete, context dependent execution of a variant prescribed by the model. A WFMS facilitates the management of business processes. It provides a means to describe models of business processes (build time) and it drives business processes based on an associated model (runtime). The meta model of IBM's WFMS MQSeries Workflow, i.e., the syntactical elements provided for describing business process models, and the meaning and interpretation of these syntactical elements, is described next.

A process model is a complete representation of a process, comprising a process diagram and the settings that define the logic behind the components of the diagram. Important components of a MQSeries Workflow process model include processes, activities, blocks, control flows, connectors, data containers, data structure, conditions, programs and staff. Not all of these elements will be described below.

Activities are the fundamental elements of the meta model. An activity represents a business action that is, from a certain perspective, a semantic entity of its own.

An MQSeries Workflow process model includes a number of different types of activities. These include a "program activity" which has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities. A "process activity" has a process or subprocess assigned to perform it. The process is invoked when the activity is started. A process activity represents a way to reuse a set of activities that are common to different processes. Output from the process can be used in the exit condition for the process activity and for the transition conditions to other activities.

The flow of control, i.e., the "control flow" through a running process, determines the sequence in which activities are executed. The MQSeries Workflow workflow manager navigates a path through the process that is determined by the evaluation to TRUE of start conditions, exit conditions, and transition conditions.

"Connectors" link activities in a process model. Using connectors, one defines the sequence of activities and the transmission of data between activities. Since activities might not be executed arbitrarily, they are bound together via "control connectors". A control connector might be perceived as a directed edge between two activities; the activity at the connector's end point cannot start before the activity at the start point of the connector has finished (successfully). Control connectors thus model the potential flow of control within a business process model. Default connectors specify where control should flow when the transition condition of no other control connector leaving an activity evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Process definition includes modeling of activities, control connectors between the activities, input/output containers, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the DataStructureDefinition facility. Program activities are implemented through programs. The programs are registered via the Program Definition facility. Blocks contain the same constructs as processes, such as activities, control connectors, etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows process construction through permanent refinement of activities into program and process activities (top-down), but also a process to be built out of a set of existing processes (bottom-up).

All programs which implement program activities are defined via the Program Registration Facility. Registered for each program is the name of the program, its location, and the invocation string. The invocation string consists of the program name and the command string passed to the program.

Escalation By Notification Mechanisms

For most business processes it is important that they are carried out in a certain time, either for legal reasons or to meet some company's specified quality of service. Thus workflow management systems provide a facility that makes sure that the processing of a process model does not stop without being noticed. Workflow management systems allow, during build time, the specification of time limits at the process or activity level. Actions can be specified that should be taken when the specified time limits are exceeded. The typical action is to notify somebody, i.e., to notify an addressee, so that appropriate corrective actions can be taken. This facility is, therefore, called "notification"; the appropriate information that is created and sent to the selected person and that will be part of the selected person's work list are called "notification items". Notification is the standard mechanism in workflow management systems to manage deadlines and completion targets.

In IBM's WFMS MQSeries Workflow, a process modeler can specify two properties for notifications. The first is the period of time (a) in which a process/activity must finish, and (b) in which the addressee, i.e., the person who receives the notification, must have made sure that the process/activity has finished. The second is the person that should be notified if the specified period of time allocated for carrying out the process/activity is exceeded, or the person that should be notified if the activity/process still has not finished despite sending out a notification.

Notifications for activities and processes are created and sent regardless of the state the activity or process is in. For example, the state could be "ready", "running", or "suspended".

If a process does not complete in the specified time, the specified user (in general, the process administrator) receives a process notification.

If an activity in a process does not complete in the specified time, the specified user receives a first activity notification. If the user who receives the first activity notification does not act on the first notification in a specified time, the process administrator (or, in general, another addressee according to an escalation sequence) receives a second activity notification. Thus the notification mechanism within a WFMS is a kind of escalation procedure. A process administrator, a manager, a coordinator, or any person may be specified as the addressee of the notification.

A first activity notification is made available to the designated person as a first activity notification item which is placed on the designated person's worklist(s). The first activity notification item distinguishes, for example, a number of activity states. These include whether or not the activity has not been started; whether or not the activity is currently running; whether the process to which an activity belongs has been suspended or whether all activities within the process have been also suspended; and whether the activity has finished, but has not yet completed successfully.

If the first activity notification item for an activity is overdue, the process administrator for the process to which the activity belongs (or any designated person) receives a second activity notification. The second activity notification item distinguishes the same states as a first activity notification item. A process notification is made available to the designated person as a process notification item which is placed on the designated person's worklist(s). The process notification item also provides the state of the associated process.

FIG. 1 depicts how an activity notification is specified using the Flow Definition Language of MQSeries Workflow. The notification specification in FIG. 1 defines that if the activity ProcessLoan (101) is not carried out in one day (102), a notification item is created and sent to the process administrator (103). The notification interval is started as soon as an appropriate work item has been created for the user designated to carry out the activity. As the result of notification, a first activity notification item is created for the process administrator. The process administrator views and acts on these first activity notification items in the same manner as on regular work items.

In general, if a notification interval N is specified, a notification item is created and sent after the notification interval N has been exceeded. This behavior is true for any type and level of notification. Thus no differentiation is necessary in the following description between the various levels of notification, such as first or second activity notification.

If the notification mechanism is active for an activity and the assigned employee falls behind for whatever reason, an activity notification is generated for each activity that is not carried out in time and sent to the designated person, for example, to the process administrator. Let us assume that an employee typically carries out 40 activities per day for a particular process. If he falls behind for a day, 40 activity notifications are sent to the process administrator. Thus the process administrator has 40 activity notification items on the appropriate work list with each activity notification item conveying the same problem, i.e., relating to the same basic cause. The only difference is the affected process. This state of the art processing has several disadvantages. These include that a large number of almost identical notification items need to be created, that these notification items have to be sent to the appropriate addressee, potentially clogging the network, and that the worklist of the appropriate addressee is swamped with a large number of notification items, each of which must be processed by the addressee.

The Notification Group Approach

A solution to above mentioned problems can be developed based on the observation that, from the addressee's point of view, it would be sufficient to have one single new type of notification item with a special indicator that the notification item represents several notifications. If this new type of notification item is endowed with additional query means, which when executed retrieves all created notification items, all the detail information with respect to the individual notification items can be efficiently retrieved when required. Various technologies can be used for the embodiment of that query means. For instance the query means can be implemented as a SQL QUERY statement with an appropriate SELECT clause, which can be executed with respect to a (remote) relational database, wherein the workflow management system stores the created work items (instead of sending them to the addressees).

The new notification concept solves the stated problem by providing support for grouping notifications and representing groups by single notification items. Such a group representing several notifications is called a notification group and the new type of notification item that represents the group is called a notification group item.

Based on this suggested technology, an addressee on one hand receives a single indication in form of a notification group item that a problem situation occurred with respect to a certain associated set of process activities or process models. On the other hand, this notification group item comprises query means for efficiently retrieving all actual work items created by the workflow management system qualifying under the particular query of the notification group item.

The present invention implements the definition means as additions to the workflow management system's meta model and as extensions to the application programming interface to support the additions to the meta model. This approach is superior compared to a potential embodiment in a graphical end user interface which itself would not be able to reduce the potential flood of notification items. According to the preferred embodiment, the workflow management system processes the new meta model extensions on the server more efficiently from a performance standpoint, as it would be possible within a user interface executing on a workflow client.

Extensions of the WFMS's MetaModel

The suggested definition means are explained on the basis of the flow definition language of MQSeries Workflow describing the new construct that permits defining notification groups. Without deviating from the proposed technology of the current invention, other definition approaches are possible.

The workflow management system is responsive to these new enhancements of the process model at runtime (by analyzing the enhanced process models at runtime) when controlling the execution of process model instances or activity instances. The new processing methodology of the workflow management system is outlined below together with a description of the various definitions.

The new NOTIFICATION_GROUP keyword permits named notification groups to be defined. It accepts a time period parameter, a type parameter, a source parameter, and a user parameter. In essence, the NOTIFICATION_GROUP keyword supports the definition of a multitude of notifications, relating to a multitude of activities within the same or different process model, forming a notification group.

The time period parameter TIME_PERIOD defines how often a new instance of a notification group is created or generated. Thus, how often a notification group item is created and sent is controlled. This parameter accepts three different values. These include:

1. NO specifies that there is no time period. This sends a notification item to the addressee(s) for every notification that occurs. This is the default for compatibility with the existing processing.
2. UNLIMITED specifies that the time period is unlimited. This causes the creation and sending of a notification group item when the first notification occurs that belongs to that group. As long as the user and addressee does not delete the notification group item, no new notification group item is sent when a new notification occurs. If the user has deleted the notification group item, a new notification group item is generated when a new notification occurs that belongs to that notification group.
3. The specification of a certain time period for not sending a subsequent notification group item upon creation of a notification item. This causes the generation of a new notification group item when the time between the first notification in the current notification group item and a new notification (i.e., the currently last notification event) exceeds the specified time period.

The type parameter TYPE identifies the type of notification items the notification group contains; i.e., the TYPE parameter can be viewed as a filter criterion with respect to the type of comprised notification items. For example, one notification group could contain process notifications, another notification group first activity notifications, another one second activity notifications, and even another one process and activity notifications. Process notifications are selected via the specification of the PROCESS_NOTIFICATIONS keyword, first activity notifications are selected via the FIRST_ACTIVITY_NOTIFICATIONS keyword, and second activity notifications are selected via the SECOND_ACTIVITY_NOTIFICATIONS keyword. The TYPE specification in FIG. 2, for example, defines via the PROCESS_NOTIFICATIONS keyword that the notification group should contain process notifications.

The source parameter SOURCE defines the scope of the notification group in terms of where the notifications are coming from, such as whether the group should contain all notifications of a certain process (identified via the PROCESS keyword), or just the notification of an individual activity within a process (identified via the ACTIVITY keyword). The SOURCE specification in FIG. 2, for example, specifies that the notification group should contain the process notifications, identified by the PROCESS_NOTIFICATIONS keyword, from PROCESS Loans only.

The user parameter USER defines the scope of the notification group in terms of the users that cause notifications to happen, such as whether the notification group should contain only notifications of a particular user, for all users, or for selected users. That means, for instance, that it can be specified that for each individual user who causes notifications to be generated, a separate notification group item is maintained (refer to the FOR EACH USER parameter below). As another example, a notification group could be maintained for selected, explicitly specified users. As a further example, individual notification groups could be maintained for particular, implicitly specified users. Selection of the user can be specified via any organizational query, such as all users that are assigned to a particular role in a particular organizational unit; for example, system programmers in an operations department. The FOR EACH USER specification in FIG. 3, for example, specifies that a notification group is maintained for each user who causes notifications to be generated.

More complex notification groups can be constructed by aggregating notification groups into new notification groups.

In addition to the functionality described above, the current state-of-the-art application programming interface that provides a set of operations for notification items is extended to support the extended functions. This set of functions includes deletion of notification items or querying the details of a notification item, such as the identifier of the associated process, or the user that caused the notification to be sent out.

Further, the application programming interface is extended to support notification group items the same way as regular notification items. In addition, it provides a query function that allows retrieving the individual notification items that make up the notification group and then using the currently available operations on the individual notification items. These extensions to the appropriate application programming interface associated with the WFMS can be implemented by one skilled in the art once given the new requirements of the present invention, and implementation details need not be described herein.

Examples of Notification Group Definitions

The following examples should help to illustrate the definition and properties of notification groups. FIG. 2 defines a notification group comprising process notifications identified via PROCESS_NOTIFICATIONS (203) that are created for instances of the Loans process model as identified via the SOURCE parameter (201). For all notifications that fall into a four hour window (202), an instance of the notification group is created and thus a notification group item is generated.

FIG. 3 defines a notification group for all activity notifications that are created for the Assess Risk activity of the Loan Process process (301). A notification group is created for each user that caused the creation of a notification. This characteristic is defined by the FOR EACH USER parameter (303). For each user, only one instance of the notification group is maintained and thus at most one notification group item may exist. This characteristic is defined by the UNLIMITED parameter (302) defining that sending a notification group item will never be repeated, unless the user has deleted the notification group item. The notification group is created when the first activity notification occurs. All subsequent activity notifications are stored, and are retrieved and sent only if the addressee executes the query function associated with the notification group item. Of course, multiple SOURCE statements (301) may be included within the notification group definition.

The current invention provides an approach to notifications in a WFMS which significantly reduces the number of notification items created and sent to certain addressees. A multitude of activities, or even all activities within a process model, may contribute with a single notification item of a new type only to an addressee's work list. Thus the proposed invention provides the technical basis for an improved clarity of the addressee's work list; it will not be swamped with notification items provoked by the same cause. Moreover, the reduction of the potential large number of created notification items sent out by the workflow management system to the addressee's workflow clients helps to reduce the risk of congestion within the computer network.

The proposed technology at the same time still maintains the full flexibility of the current notification approaches. The notification group item acts as the representative for a multitude of notification items and includes a query function which, when executed, retrieves all the created but stored notification items; thus the full information spectrum is still available to an addressee.

FIG. 4 illustrates a representative workstation hardware environment in which the present invention may be practiced. The environment of FIG. 4 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 5:
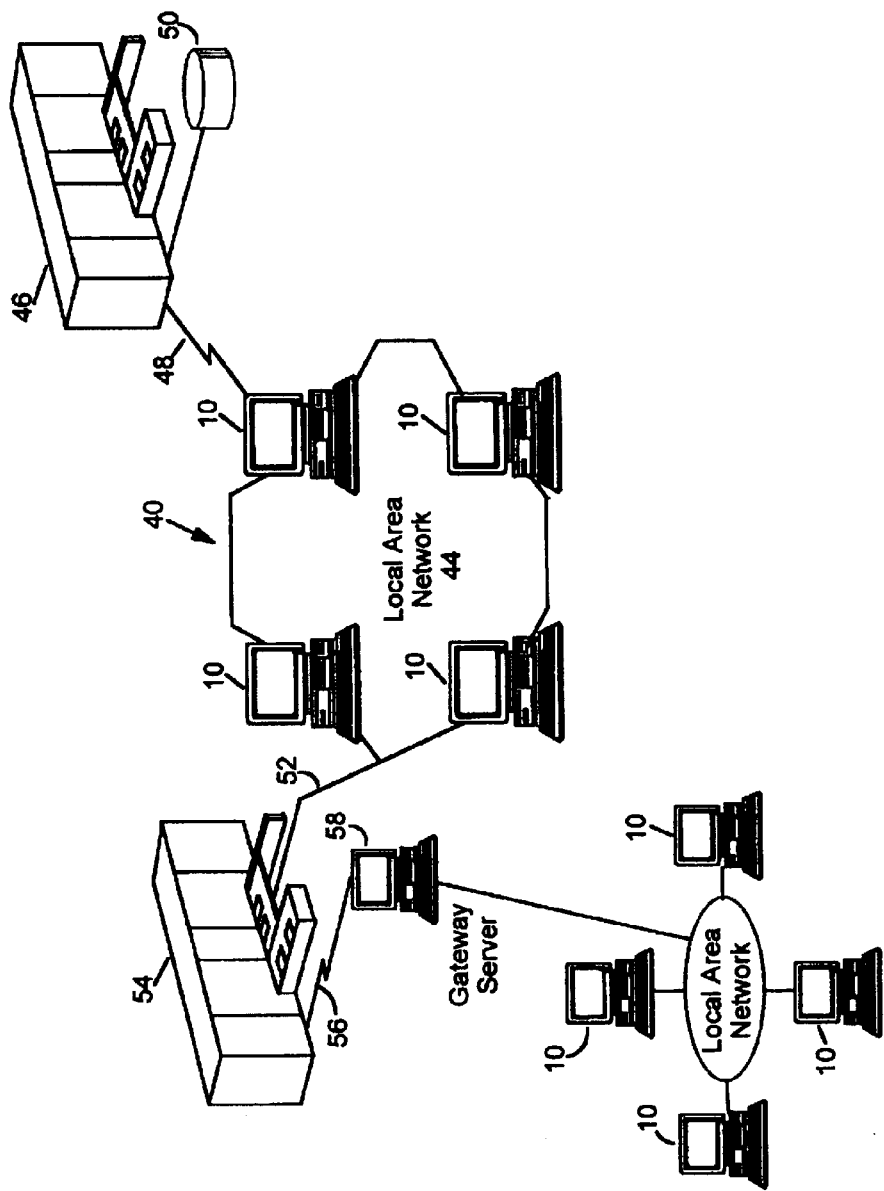
FIG. 5 is a diagram of a networked computing environment in which the present invention may be practiced.

FIG. 5 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 5, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. In a workflow management system in a computing environment, a system for reducing a number of notification items sent to an addressee, comprising:

definition means related to notifications for at least one process model with at least one activity of a workflow management system (WFMS); and means for associating a notification group with at least one process model and/or at least one activity, said process model and/or said activity being associated with a notification specification referring to an addressee, for whom the WFMS creates and to whom the WFMS sends a notification item if an instance of said associated process model and/or an instance of said associated activity is not completed according to certain conditions, wherein said WFMS sends to said addressee a notification group item as representative for one or more created notification items of associated process models and/or associated activities, thereby preventing said created notification items from being sent to said addressee.

2. The system for reducing a number of notification items according to claim 1, wherein said notification group item comprises query means, which when executed retrieves all created notification items for said addressee.

3. The system for reducing a number of notification items according to claim 2, wherein said WFMS responds to said notification group by sending said notification group item when a first notification item is created for said addressee.

4. The system for reducing a number of notification items according to claim 3,
wherein said definition means further comprises a TIME parameter, and said WFMS is responsive to said TIME parameter by sending a further notification group item to said addressee if an amount of time between creation of said notification group item and a last created notification item exceeds a value of said TIME parameter.

5. The system for reducing a number of notification items according to claim 4,
wherein said TIME parameter has a default value of unlimited, said WFMS being responsive to said default value by preventing any further notification group item of said notification group from being sent to said addressee.

6. The system for reducing a number of notifications items according to claim 3,
wherein said definition means further comprises a TYPE parameter for distinguishing different types of notification items and said notification group item being a representative of notification items according to said TYPE parameter only.

7. The system for reducing a number of notification items according to claim 3,
wherein said definition means further comprises a SOURCE parameter, and said SOURCE parameter defines that a certain activity of a certain process model is associated with said notification group.

8. The system for reducing a number of notification items according to claim 3,
wherein said definition means further comprises a USER parameter, and said WFMS responds to said USER parameter by creating, if specified by said USER parameter, a separate notification group item for each user causing said notification item to be created.

9. A method for reducing notifications for at least one process model with at least one activity in a workflow management system (WFMS) in a computer environment, said method comprising the steps of:
determining if a notification group definition is associating a notification group with a process model or an activity,
determining if said process model or said activity being associated with a notification specification is referring to an addressee, for whom the WFMS is to create and send thereto a notification item if an instance of said associated process model and/or an instance of said associated activity is not completed according to certain conditions; and
sending, if a notification group definition is determined, to said addressee a single notification group item as representative for one or more created notification items of said associated process model or said associated activity and preventing said created notification items from being sent to said addressee.

10. A method according to claim 9, wherein the created notification items are stored and wherein said notification group item sent to addressee includes a query request function, which when executed retrieves the stored notification items and sends them to the addressee.

11. A method according to claim 10, wherein said sending step sends said notification group item when a first notification item associated with the notification group is created for said addressee.

12. A method according to claim 11, wherein said determining step further determines if said notification group definition includes a defined hold period, and
wherein said sending step sends a further notification group item to said addressee upon creation of a subsequent notification item, if the time since creation of said notification group item and the subsequent notification item exceeds a value of the defined hold period.

13. A method according to claim 12, wherein a default value of the defined hold period is set to unlimited, and wherein no further notification group item of said notification group is sent to said addressee when the default value is set to unlimited.

14. A method according to claim 11, wherein said WFMS includes a type parameter which distinguishes different types of notification items,
wherein said determinating step determines if said notification group definition includes a type parameter, and
wherein said sending step sends a notification group item to said addressee for notification items in accordance with said type parameter.

15. A method according to claim 11,
wherein said WFMS includes a user parameter, and said determining step determines if said notification group definition comprises a user parameter, and
wherein said sending step creates, if specified by said user parameter, a separate notification group item for each user causing said notification item to be created.

16. A method according to claim 11, wherein said WFMS includes a user parameter, and
said determining step determines if said notification group definition comprises a user parameter, and
wherein said sending step creates, if specified by said user parameter, a separate notification group item only for each user explicitly specified with said user parameter and causing said notification item to be created.

17. A method according to claim 11, wherein said WFMS includes a user parameter, and
said determining step determines if said notification group definition comprises a user parameter, and
wherein said sending step creates, if specified by said user parameter, a common notification group item only for each user implicitly specified with said user parameter and causing said notification item to be created.

* * * * *